(12) United States Patent
Bao

(10) Patent No.: US 10,587,738 B2
(45) Date of Patent: Mar. 10, 2020

(54) DISPLAY MODULE AND ELECTRONIC DEVICE

(71) Applicant: GUANGDONG OPPO MOBILE TELECOMMUNICATIONS CORP., LTD., Dongguan, Guangdong (CN)

(72) Inventor: Xiaoming Bao, Guangdong (CN)

(73) Assignee: GUANGDONG OPPO MOBILE TELECOMMUNICATIONS CORP., LTD., Dongguan, Guangdong (CN)

( * ) Notice: Subject to any disclaimer, the term of this patent is extended or adjusted under 35 U.S.C. 154(b) by 152 days.

(21) Appl. No.: 15/798,989

(22) Filed: Oct. 31, 2017

(65) Prior Publication Data

US 2018/0213071 A1    Jul. 26, 2018

(30) Foreign Application Priority Data

Jan. 26, 2017 (CN) .......................... 2017 1 0057464
Jan. 26, 2017 (CN) .................... 2017 2 0107495 U

(51) Int. Cl.

| | |
|---|---|
| *G06F 3/038* | (2013.01) |
| *H04M 1/02* | (2006.01) |
| *G06F 3/041* | (2006.01) |
| *G06F 1/16* | (2006.01) |
| *G06F 3/042* | (2006.01) |
| *G03B 17/48* | (2006.01) |
| *G03B 29/00* | (2006.01) |
| *G02F 1/133* | (2006.01) |
| *G02F 1/1333* | (2006.01) |

(52) U.S. Cl.
CPC ........ *H04M 1/0266* (2013.01); *G06F 1/1626* (2013.01); *G06F 3/041* (2013.01); *G06F 3/0421* (2013.01); *G06F 3/0428* (2013.01); *H04M 1/0264* (2013.01); *G02F 1/13338* (2013.01); *G02F 2001/13312* (2013.01); *G03B 17/48* (2013.01); *G03B 29/00* (2013.01); *G06F 2203/04103* (2013.01); *H04M 2250/22* (2013.01)

(58) Field of Classification Search
CPC ...... G06F 3/042; G06F 3/0421; G06F 3/0428; G06F 3/041; G06F 2203/04103
See application file for complete search history.

(56) References Cited

U.S. PATENT DOCUMENTS 8,633,867 B2 * 1/2014 Kim ...................... G06F 1/1626
                                                    345/1.1
8,907,902 B2 * 12/2014 Cheng .................... G09G 3/342
                                                    345/173

(Continued)

FOREIGN PATENT DOCUMENTS

CN    101754614 A    6/2010
CN    101893914 A    11/2010
(Continued)

OTHER PUBLICATIONS

China Search Report issued in corresponding China application No. 201710057464.X, dated Mar. 4, 2019 (14 pages).

(Continued)

*Primary Examiner* — Vijay Shankar
(74) *Attorney, Agent, or Firm* — Ladas & Parry LLP

(57) ABSTRACT

A display module includes a display panel. The display panel includes a display portion and a transparent portion. The display portion includes a number of pixels. The transparent portion is adjacent to the display portion and surrounded by the pixels. An electronic device is also provided.

20 Claims, 7 Drawing Sheets

(56) References Cited

U.S. PATENT DOCUMENTS

| | | | |
|---|---|---|---|
| 9,413,965 B2* | 8/2016 | Ryu | H04N 5/23293 |
| 9,710,022 B2* | 7/2017 | Lee | G06F 1/1656 |
| 2009/0102763 A1 | 4/2009 | Border et al. | |
| 2010/0207903 A1* | 8/2010 | Kim | G06F 1/1626 |
| | | | 345/173 |
| 2012/0182437 A1 | 7/2012 | Dudek et al. | |
| 2013/0207952 A1 | 8/2013 | Yu | |
| 2017/0131879 A1* | 5/2017 | Lee | G06F 1/1647 |

FOREIGN PATENT DOCUMENTS

| | | |
|---|---|---|
| CN | 102280074 A | 12/2011 |
| CN | 202889484 U | 4/2013 |
| CN | 104484016 A | 4/2015 |
| CN | 105049556 A | 11/2015 |
| CN | 102411878 B | 12/2015 |
| CN | 106155325 A | 11/2016 |
| CN | 106293444 A | 1/2017 |
| CN | 107092309 A | 8/2017 |
| EP | 2388997 A2 | 11/2011 |
| EP | 3051803 A1 | 8/2016 |

OTHER PUBLICATIONS

Examination report issued in corresponding Indian application No. 201714046075, dated Nov. 29, 2019 (6 pages), with text translated into English.

* cited by examiner

DISPLAY MODULE AND ELECTRONIC DEVICE

CROSS-REFERENCE TO RELATED APPLICATION

This application claims priority to a Chinese application No. 201710057464.X filed on Jan. 26, 2017, titled "ELECTRONIC DEVICE", and a Chinese application No. 201720107495.7 filed on Jan. 26, 2017, titled "ELECTRONIC DEVICE". The entirety of the above-mentioned applications is hereby incorporated by reference herein.

TECHNICAL FIELD

The present disclosure relates to the field of consumer electronics in general. More particularly, and without limitation, the disclosed embodiments relate to a display module, and an electronic device.

BACKGROUND

With the development of science and technology, electronic products such as smart phones are widely used in the world.

Screen-to-body ratio is one of the most important aspects of a smart phone, and is used generally to represent a size of a display screen relative to the whole smart phone.

However, the screen-to-body ratio of the smart phone is designed relatively low nowadays. Generally, a low screen-to-body ratio may indicate a small display area, and therefore, resulting in a poor user experience. Therefore, it is desirable to provide a smart phone with high screen-to-body ratio to greatly enhance user experience.

SUMMARY

In accordance with an aspect, in one embodiment of the present disclosure, a display module is provided. The display module includes a display panel. The display panel includes a display portion and a transparent portion. The display portion includes a plurality of pixels. The transparent portion is adjacent to the display portion and surrounded by the pixels.

In accordance with another aspect, in one embodiment of the present disclosure, an electronic device is provided. The electronic module includes a display module and an optical element. The display module includes a display panel. The display panel includes a display portion and a transparent portion. The display panel has a display surface and a rear surface opposite to the display surface. The display portion includes a plurality of pixels. The transparent portion is adjacent to the display portion and surrounded by the plurality of pixels. The optical element is disposed on a side of the rear surface and facing the transparent portion and configured to receive light penetrating the transparent portion or emit light to penetrate the transparent portion.

In accordance with a still another aspect, in one embodiment of the present disclosure, an electronic device is provided. The electronic device a first display module, a second display module and an optical element. The first display module includes a first display panel. The first display panel includes a first active area and a first transparent non-active area. The first transparent non-active area is surrounded by and adjacent to the first active area. The second display module coupled to the first display module. The second display module includes a second display panel. The second display panel includes a second active area and a second transparent non-active area. The second transparent non-active area is surrounded by and adjacent to the second active area. The optical element is alternatively disposed to face the first transparent non-active area or face the second transparent non-active area.

BRIEF DESCRIPTION OF THE DRAWINGS

The accompanying drawings, which are incorporated in and constitute a part of this specification, illustrate exemplary embodiments of the present disclosure, and together with the description, serve to explain the principles of the disclosure.

DETAILED DESCRIPTION OF EMBODIMENTS

This description and the accompanying drawings that illustrate exemplary embodiments should not be taken as limiting. Various mechanical, structural, electrical, and operational changes may be made without departing from the scope of this description and the claims, including equivalents. In some instances, well known structures and techniques have not been shown or described in detail so as not to obscure the disclosure. Similar reference numbers in two or more figures represent the same or similar elements. Furthermore, elements and their associated features that are disclosed in detail with reference to one embodiment may, whenever practical, be included in other embodiments in which they are not specifically shown or described. For example, if an element is described in detail with reference to one embodiment and is not described with reference to a second embodiment, the element may nevertheless be claimed as included in the second embodiment.

The disclosed embodiments relate to a display module. The electronic device having a display function can be equipped with the display module. The electronic devices can be, for example, smart phones, tablets (PDA), smart watches, smart bracelets, smart glasses, or smart helmets. In the embodiments of the present disclosure, the phone equipped with the display module is described as an example.

Figure 1:
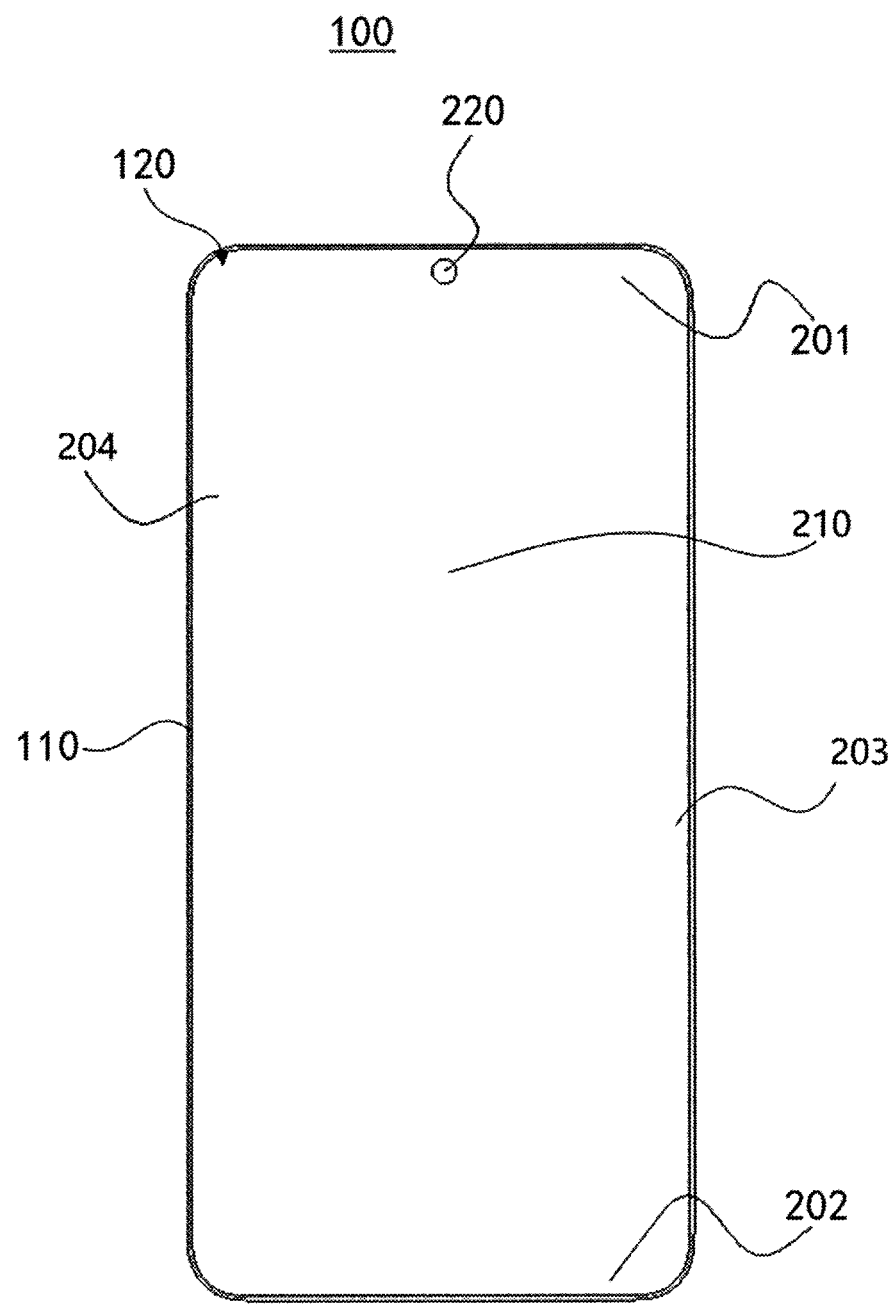
FIG. 1 illustrates a schematic representation of a phone equipped with an exemplary display module, in accordance with a first embodiment of the present disclosure.
Figure 2:
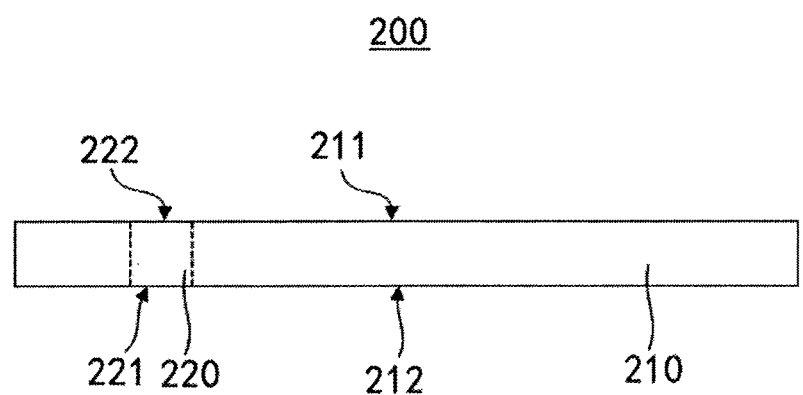
FIG. 2 illustrates a cross-sectional, schematic representation of an exemplary display panel of the display module, in accordance with the first embodiment of the present disclosure.

FIG. 1 illustrates a phone 100 equipped with a display module 120 in accordance with a first embodiment of the present disclosure. The phone 100 includes the display module 120, as well as a housing 110. The display module 120 is mounted to the housing 110. It is noted that, the phone 100 may include other components, i.e., processors, cameras, sensors, microphones, flashlights etc. The display module 120 further illustrates a display panel 200 as shown in FIG. 2.

The display module 120 is substantially rectangular, and includes a first side 201, a second side 202, a third side 203, and a fourth side 204 (as shown in FIG. 1). The first side 201 is substantially parallel to the second side 202, and the third side 203 is substantially parallel to the fourth side 204. Each of the first side 201 and the second side 202 is connected between the third side 203 and the fourth side 204. In the present embodiment, each of the first side 201 and the second side 202 is shorter than either of the third side 203 and the fourth side 204. In alternative embodiment, each of the first side 201 and the second side 202 may be longer than either of the third side 203 and the fourth side 204.

In the present embodiment, the display panel 200 includes a display portion 210 and a transparent portion 220. The transparent portion 220 is adjacent to the display portion 12. The display portion 12 is in contact at the edge of the transparent portion 220, and the transparent portion 220 is surrounded by the display portion 210.

The display portion 210 includes a number of pixels so as to display an image. In this embodiment, the display panel 200 can be a liquid crystal display (LCD) display panel. A configuration of the display portion 210 may include a backlight module, a thin film transistor (TFT) array, a liquid crystal layer, a color filter, etc. In another embodiment, the display panel 200 can be an organic light-emitting diode (OLED) display panel, and the display portion 210 may include a number of components, i.e., a substrate, an anode layer, a hole-injection layer, an organic luminous layer, an electron-transport layer, a cathode layer, etc. In still another embodiment, the display panel 200 can be a LED display panel, and the display portion 210 may include a number of components, i.e., a LED array, a drive circuit, etc. In addition, the display panel 210 can be a rigid panel or a flexible panel.

In the present embodiment, the transparent portion 220 is located adjacent to the first side 101 but far away from the second side 102. In another embodiment, the transparent portion 220 may be located adjacent to the second side 202 but far away from the first side 101. In still another embodiment, the transparent portion 220 may be located adjacent to the third side 203 but far away from the fourth side 204. In still another embodiment, the transparent portion 220 may be located adjacent to the fourth side 204 but far away from the third side 203. The transparent portion 220 is surrounded by the pixels of the display portion. The transparent portion 220 without the pixels is made of transparent material, i.e., glass. In this embodiment, the display panel 200 can be a LCD display panel, and the display panel 200 can be made of a glass substrate. A primary area of the glass substrate is defined to dispose, for example, a backlight module, a TFT array, a liquid crystal layer and a color filter so as to form the display portion 210. A small area of the glass substrate is also defined to form the transparent portion 220. The small area is adjacent to and surrounded by the primary area and being free of the backlight module, the TFT array, and the liquid crystal layer and a color filter. In application, light can penetrate through the transparent portion 220. Light transmittance of the transparent portion 14 is greater than 50%.

In addition, the display portion 210 includes a display surface 211 and a rear surface 212 opposite to the display surface 211. The transparent portion 220 has a first surface 221 and a second surface 222 opposite to the first surface 221. The first surface 221 is located on the same side with the rear surface 212 and is adjacent to the rear surface 212, and the first surface 221 and the rear surface 212 are coplanar. The second surface 222 is located on the same side with the display surface 211 and is adjacent to the display surface 211, and the second surface 222 and the display surface 211 are coplanar. In other words, the display portion 210 is as thick as the transparent portion 220. A vertical projection of the transparent portion 220 on the display surface 211 is adjacent to and surrounded by a vertical projection of the display portion 210 on the display surface 211. Thus, the process of manufacturing the display panel 200 can be easily realized. In addition, a space on the side of the rear surface 212 and the first surface 221 is adapt for accommodating other components such as optical elements can be disposed.

Figure 3:
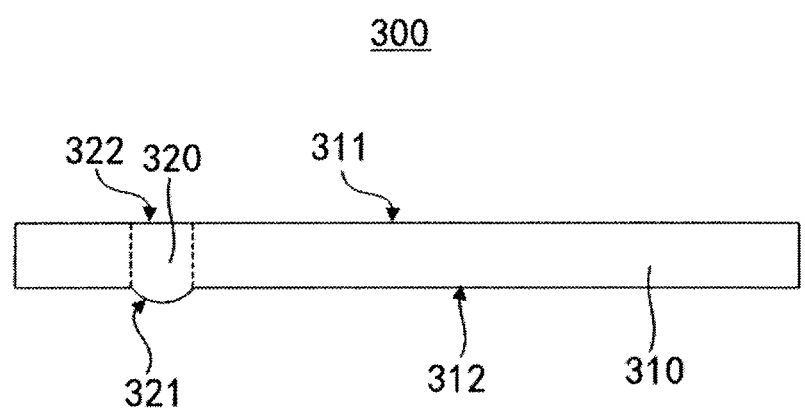
FIG. 3 illustrates a cross-sectional, schematic representation of an exemplary display panel, in accordance with a second embodiment of the present disclosure.

FIG. 3 illustrates a display panel 300 in accordance with a second embodiment of the present disclosure. The display panel 300 is similar to the display panel 200 in the first embodiment, and includes a display portion 310 and a transparent portion 320. The display portion 310 includes a display surface 311 and a rear surface 312. The transparent portion 320 includes a first surface 321 and a second surface 322. However, the first surface 321 of the transparent portion 320 is a convex surface. In the present embodiment, the first surface 321 protrudes away from the second surface 322 of the display portion 310. Furthermore, the transparent portion 320 can be formed a converging lens so that the light penetrating though the transparent portion 320 can be converged to the optical element facing the first surface 321. Thus, due to the converged light arrives at the optical element, the optical element can achieve an excellent optical effect such as image effect.

Figure 4:
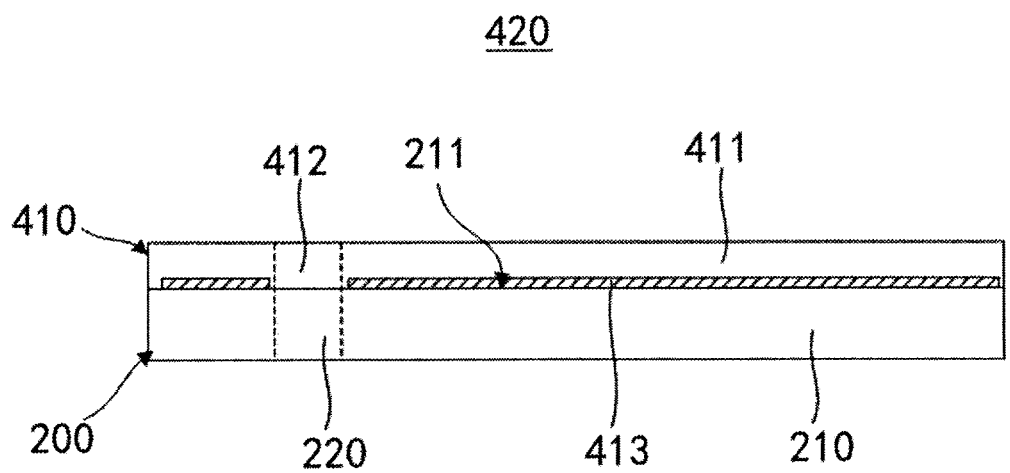
FIG. 4 illustrates a cross-sectional, schematic representation of an exemplary display module, in accordance with a third embodiment of the present disclosure.

FIG. 4 illustrates a display module 420, in accordance with a third embodiment of the present disclosure. In the present embodiment, the display module 420 includes a transparent cover 410 (i.e., cover lens) covering the display panel 200. The display module 420 can include the display panel 300, or other display panels according to the present disclosure, instead of the display panel 200. The transparent cover 410 is attached to the display panel 200 in a manner of full lamination (also called direct bonding, optical bonding or non-air gap) or edge lamination (also called air bonding or air gap). In the present embodiment, the transparent cover 410 is attached to the display surface 211 of the display panel 200 in a manner of full lamination by using an optically clear adhesive (OCA).

The transparent cover 410 includes a first portion 411 and a second portion 412. The first portion 411 is located on the display portion 210, and the second portion 412 is located on the transparent portion 220. The transparent cover 410 can be, but not limited to, made of a material selected from a group of glass, sapphire and polyvinyl chloride. In another embodiment, the transparent cover 410 can be made of a transparent glass substrate with a first area and a second area adjacent to and surrounded by the first area. The first area of the transparent glass substrate is disposed by, for example, a touch sensor circuit 413, and the second area of the transparent glass substrate is free of the touch sensor circuit 413. The touch sensor circuit 413 is formed at the first portion 411 and located on a surface of the first portion 411 facing the display panel 200. The first portion 431 has the touch sensor circuit 433 formed. A surface of the second portion 412 facing the display panel 200 is free of the touch sensor circuit 413.

Figure 5:
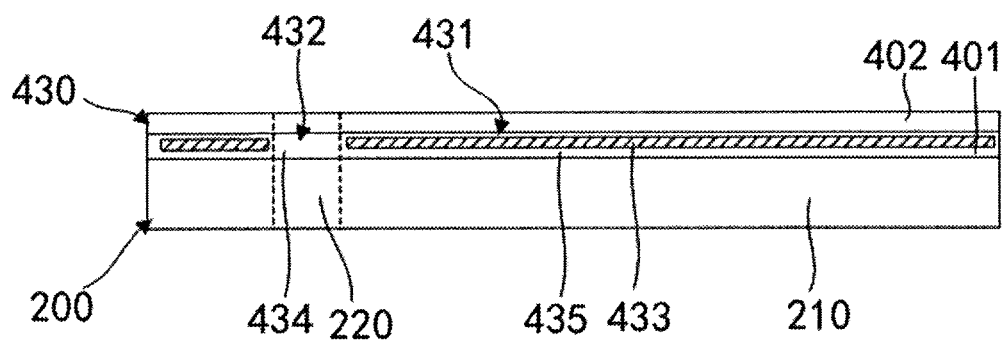
FIG. 5 illustrates a cross-sectional, schematic representation of another exemplary display module, in accordance with a third embodiment of the present disclosure.

In another example as shown in FIG. 5, the transparent cover 430 can include a touch panel 401 and a protecting cover 402 disposed on the touch panel 401. The touch panel 401 is located between the display panel 200 and the protecting cover 402. The touch sensor circuit 433 is disposed in the touch panel 401. The touch panel 401 has a first part 434 on the transparent portion 220. The first part 434 and a part of the protecting cover 432 on the first part 434 form a second portion 432 of the transparent cover 430. The touch panel 432 has a second part 435 on the display portion 210. The second part 435 and a part of the protecting cover 401 on the second part 435 form a first portion 431 of the transparent cover 430. The touch sensor circuit 433 is disposed in the first portion 431 of the touch panel 401. The first portion 431 has the touch sensor circuit 433 formed. The protecting cover 402 can be, but not limited to, made of a material selected from a group of glass, sapphire and polyvinyl chloride.

As described above, when the display panel 200 is manufactured, a glass substrate is provided and is defined a primary region and a preserved region adjacent to and surrounded by the primary region. The preserved region is prepared for the transparent portion 220. In the preserved region, the display components of the display panel 200 are omitted, thereby forming a transparent non-active area. The display portion 210 is an active area of the display panel 200. The transparent non-active area is surrounded by and adjacent to the active area. It is noted that, a conventional phone generally includes a border region. An opening is further formed in the border region for the other components, i.e., optical element. Thus, the screen-to-body ratio of the conventional phone is low. According to the present disclosure, the border region for the optical element can be omitted so that a narrow borders design is achieved. During forming the transparent portion 220, it is not necessary to form the opening in the display panel 200. Thus, a damage of the display panel 200 can be avoided. Moreover, the area of the transparent portion 220 can be smaller than the area of the opening for the optical element of the conventional phone. Thus, the screen-to-body ratio of the display panel 200 is high. The display panel 200 with high screen-to-body ratio can enhance the user experience.

Figure 6:
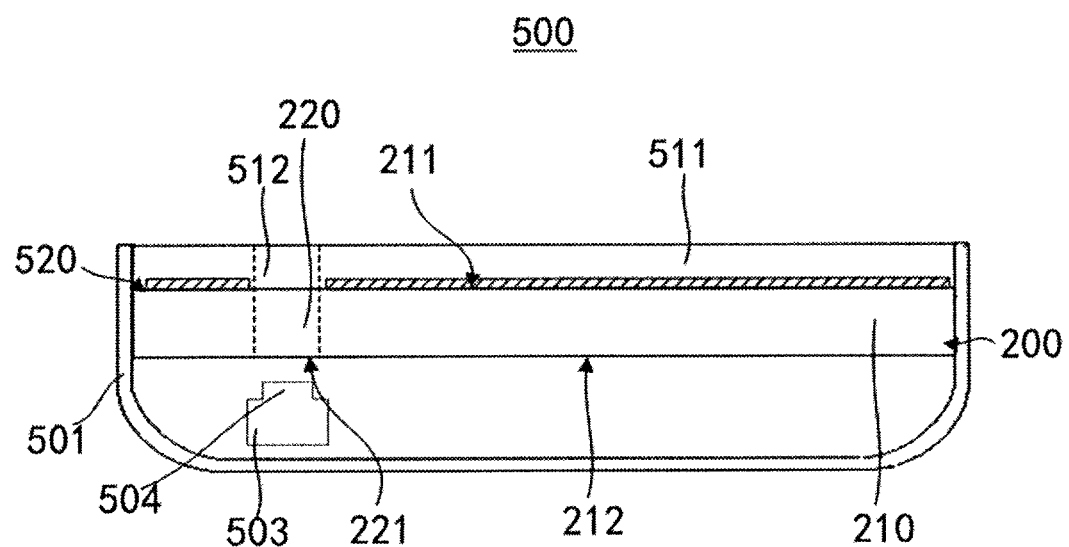
FIG. 6 illustrates a cross-sectional, schematic representation of an exemplary electronic device, in accordance with a fourth embodiment of the present disclosure.

FIG. 6 illustrates an electronic device 500, in accordance with a fourth embodiment of the present disclosure. The electronic device 500 includes a housing 501, a display module 520 and an optical element 503. The housing 501 is configured for accommodating the display module 520, the optical element 503, and other components of the electronic device 500. The display module 520 is similar to the display module 420. Also, the display panel of the display module 520 can be the display panel 300, or other display panels according to the present disclosure, instead of the display panel 200.

The optical element 503 is disposed on the side of the rear surface 212. The optical element 503 faces the first surface 221 of the transparent portion 220. The optical element 503 can be selected from a group of a camera, a light sensor, an optical fingerprint sensor, and a flashlight. In the present embodiment, the optical element 503 is a camera. The optical element 503 such as the camera has a light sensing area 504, a vertical projection of the light sensing area 504 on the display surface 211 is surrounded by and adjacent to a vertical projection of the transparent portion 220 on the display surface 211. In an exemplary embodiment, a central position of a vertical projection of the transparent portion 220 on the display surface 211 is overlapped with a central position of a vertical projection of the optical element 503 on the display surface 211. Thus, external incident light into the display panel 200 can penetrate through the transparent portion 220 to the optical element 503, and light emitting from the optical element 503 also can penetrate through the transparent portion 220 to outside.

In another embodiment, the electronic device can include a number of optical elements. The optical elements face the common transparent portion. The optical elements define a light sensing area, a vertical projection of the light sensing area on the display surface is surrounded by and adjacent to a vertical projection of the transparent portion on the display surface. In other words, a vertical projection of a sensing area of each of the optical element on the display surface is located inside a vertical projection of the light sensing area on the display surface. Otherwise, the display panel may include a number of transparent portions and a number of optical elements. Each of the optical elements faces a corresponding transparent portion and has a light sensing area. A vertical projection of the light sensing area on the display surface is surrounded by and adjacent to a vertical projection of the corresponding transparent portion on the display surface.

Figure 7:
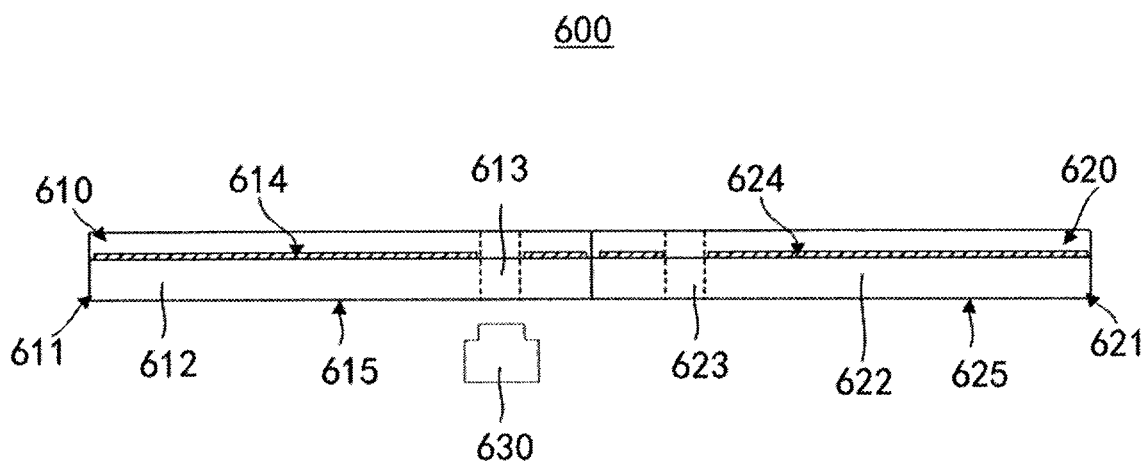
FIG. 7 illustrates a cross-sectional, schematic representation of an exemplary electronic device in a dual-screen mode, in accordance with a fifth embodiment of the present disclosure.
Figure 8:
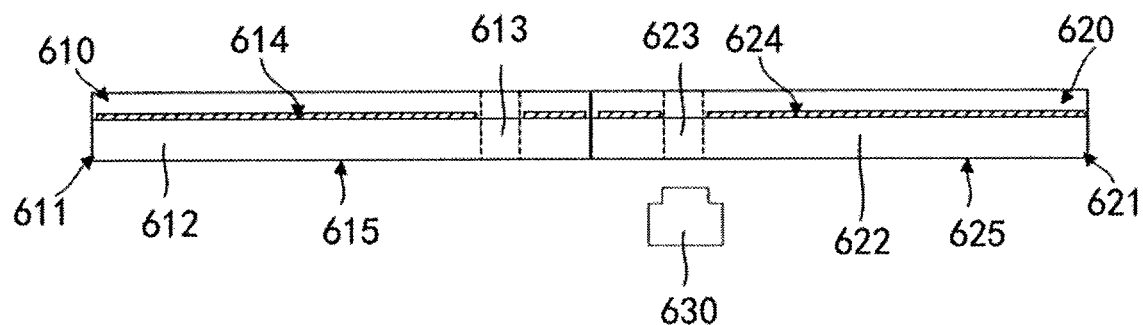
FIG. 8 illustrates a cross-sectional, schematic representation of an exemplary electronic device in a dual-screen mode, in accordance with the fifth embodiment of the present disclosure.

FIG. 7 and FIG. 8 illustrate an electronic device 600, in accordance with a fifth embodiment of the present disclosure. The electronic device 600, such as a dual-screen mobile phone, includes a first display module 610, a second display module 620 and an optical element 630. Each of the first display module 610 and the second display module 620 is similar to the display module 420.

In the present embodiment, the first display module 610 includes a first display panel 611. The first display panel 611 includes a first display portion 612 and a first transparent portion 613. The first display panel 611 has a first display surface 614 and a first rear surface 615 opposite to the first display surface 614. The first transparent portion 613 is adjacent to and surrounded by the first display portion 612. The first transparent portion 613 is a transparent non-active area of the first display panel 611, and the first display portion 612 is an active area of the first display panel 611. The transparent non-active area is surrounded by and adjacent to the active area. External incident light into the first display panel 611 can penetrate through the first transparent portion 613. The first display portion 612 is similar to either the display portion 210 or the display portion 310, and the first transparent portion 613 is similar to either the transparent portion 220 or the transparent portion 320.

The second display module 620 is, for example, pivotally coupled to the first display module 610. The second display module 620 includes a second display panel 621. The second display panel 621 includes a second display portion 622 and a second transparent portion 623. The second display panel 621 has a second display surface 624 and a second rear surface 625 opposite to the second display surface 624.

The electronic device 600 can be used in a dual-screen mode. As shown in FIG. 7, in the dual-screen mode, the second rear surface 625 and the first rear surface 615 are located on the same side. The second transparent portion 623 is adjacent to and surrounded by the second display portion 622. The second transparent portion 623 is a transparent non-active area of the second display panel 621, and the second display portion 622 is an active area of the first display panel 621. The transparent non-active area is surrounded by and adjacent to the active area. The light can pass through the second transparent portion 623. The second display portion 622 is similar to either the display portion 210 or the display portion 310, and the second transparent portion 623 is similar to either the transparent portion 220 or the transparent portion 320.

The optical element 630 can be alternatively disposed on the side of the first rear surface 615 or on the side of the second rear surface 625. The optical element 630 can alternatively face the first transparent portion 613 or face the second transparent portion 623. In other words, the optical element 630 is shared by the first display module 610 and the second display module 620. For example, the optical element 630 can be disposed by means of a rotatable mechanism. When the first display module 610 is used, the optical element 630 is rotated to be disposed on the side of the first rear surface 615 of the first display panel 610 to face the first transparent portion 613, as shown in FIG. 7. Thus, the external incident light into the first display panel 610 can pass through the first transparent portion 613 (the first transparent non-active area) and arrive at the optical element 630. It is noted that, the light emitting from the optical element 630 can also pass through the first transparent portion 613 to outside. When the second display module 620 is used, the optical element 630 is rotated to be disposed on the side of the second rear surface 625 of the second display panel 620 to face the second transparent portion 623, as shown in FIG. 8. Thus, the external incident light in to the second display panel 621 can pass through the second transparent portion 623 (the second transparent non-active area) and arrive at the optical element 630. It is noted that, the light emitting from the optical element 630 also can pass through the second transparent portion 623 to outside. In other words, the optical element 630 can alternatively cooperate with the first transparent portion 613 or second transparent portion 623 to process the light.

Figure 9:
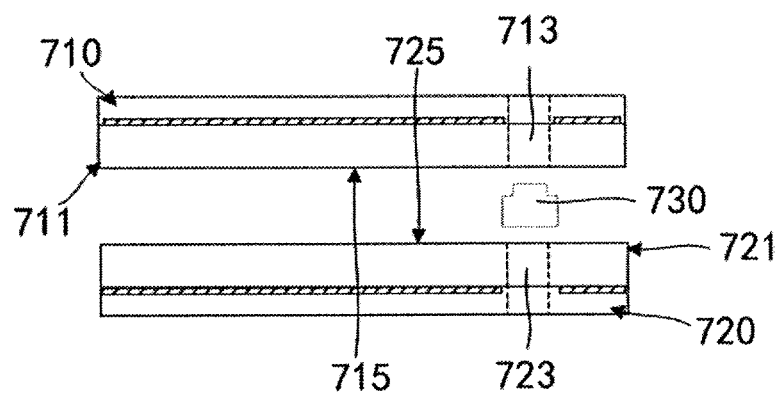
FIG. 9 illustrates a cross-sectional, schematic representation of an exemplary electronic device in another dual-screen mode, in accordance with the sixth embodiment of the present disclosure.
Figure 10:
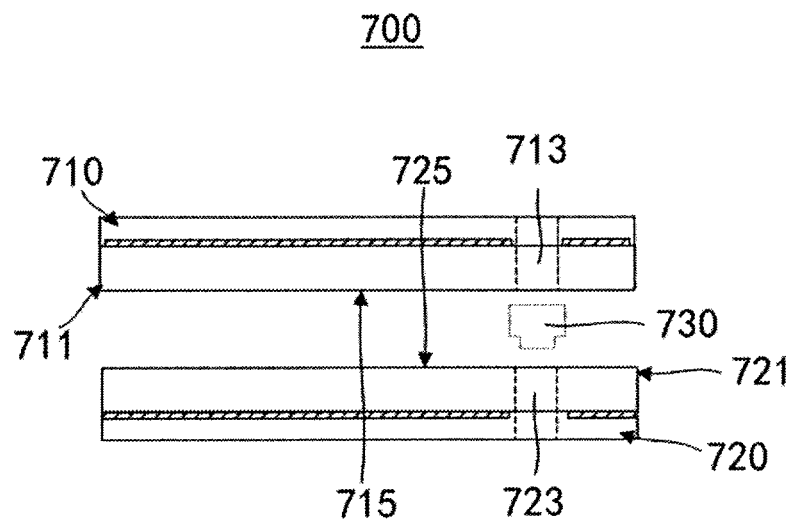
FIG. 10 illustrates a cross-sectional, schematic representation of an exemplary electronic device in another dual-screen mode, in accordance with the sixth embodiment of the present disclosure.

FIG. 9 and FIG. 10 illustrate an electronic device 700, in accordance with a sixth embodiment of the present disclosure. The electronic device 700 includes a first display module 710, a second display module 720 and an optical element 730. Each of the first display module 710 and the second display module 720 is similar to the display module 420.

In this embodiment, when the electronic device 700 is used, a first rear surface 715 of a first display panel 711 faces a second rear surface 725 of a second display panel 721. The optical element 730 is disposed between a first rear surface 715 a of a first display panel 711 and a second surface 725 of a first display panel 721. For example, the optical element 730 can be disposed by means of a rotatable mechanism. When the first display module 710 is used, the optical element 730 is rotated to be disposed on the side of the first rear surface 715 to face the first transparent portion 713 of the first display panel 711, as shown in FIG. 9. Thus, external incident light passing through the first transparent portion 713 can arrive at the optical element 730. When the second display module 720 is used, the optical element 730 is rotated to be disposed on the side of the second rear surface 725 to face the first transparent portion 723 of the second display panel 721, as shown in FIG. 10. Thus, external incident light into the second display panel 720 can pass through the second transparent portion 723 to arrive at the optical element 730. It is noted that, light emitting from the optical element 730 also can pass through the first transparent portion 713 or the second transparent portion 723 to outside. In other words, the optical element 730 can alternatively cooperate with the first transparent portion 713 or second transparent portion 723 to process the light.

Figure 11:
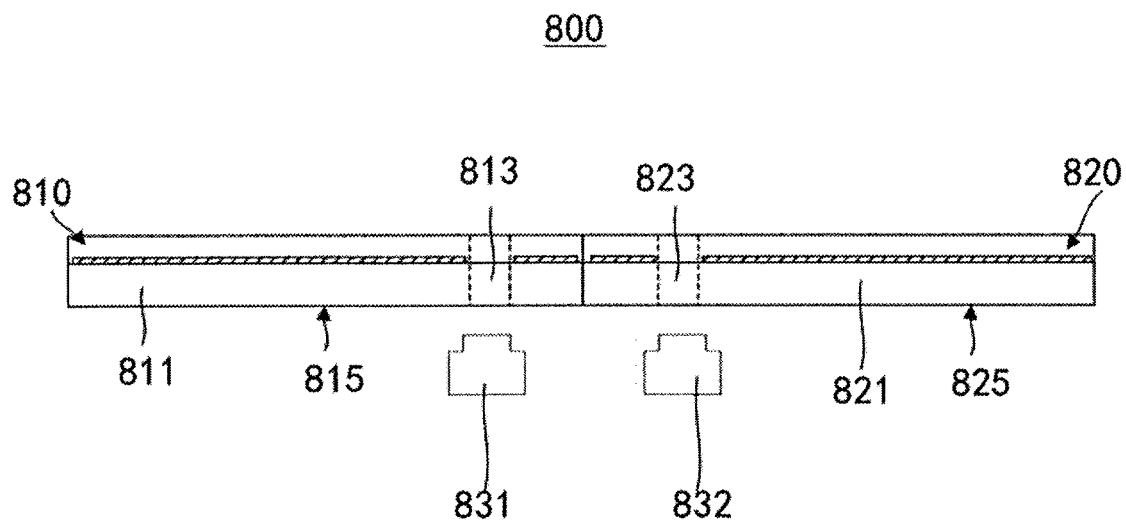
FIG. 11 illustrates a cross-sectional, schematic representation of an exemplary electronic device, in accordance with the seventh embodiment of the present disclosure.

FIG. 11 illustrates an electronic device 800, in accordance with a seventh embodiment of the present disclosure. The electronic device 800 is similar to the electronic device 600 in the fifth embodiment. In the present embodiment, the electronic device 800 includes a first display module 810, a second display module 820, a first optical element 831 and a second optical element 832. The first display module 810 is similar to the first display module 610, and the second display module 820 is similar to the second display module 820. The first display module 810 includes a first display panel 811. The first display panel 811 includes a first display portion 812 and a first transparent portion 823. The second display module 820 includes a second display panel 821. The second display panel 821 includes a second display portion 822 and a second transparent portion 823. The first optical element 831 is disposed on the side of a second rear surface 815 of the first display panel 811 to face the second transparent portion 813 of the first display panel 811. The second optical element 832 is disposed on the side of a second rear surface 825 of the second display panel 821 to face the second transparent portion 823 of the second display panel 821.

It is noted that, in other embodiment, the first rear surface 815 of a first display panel 811 may face the second rear surface 825 of a second display panel 821.

Figure 12:
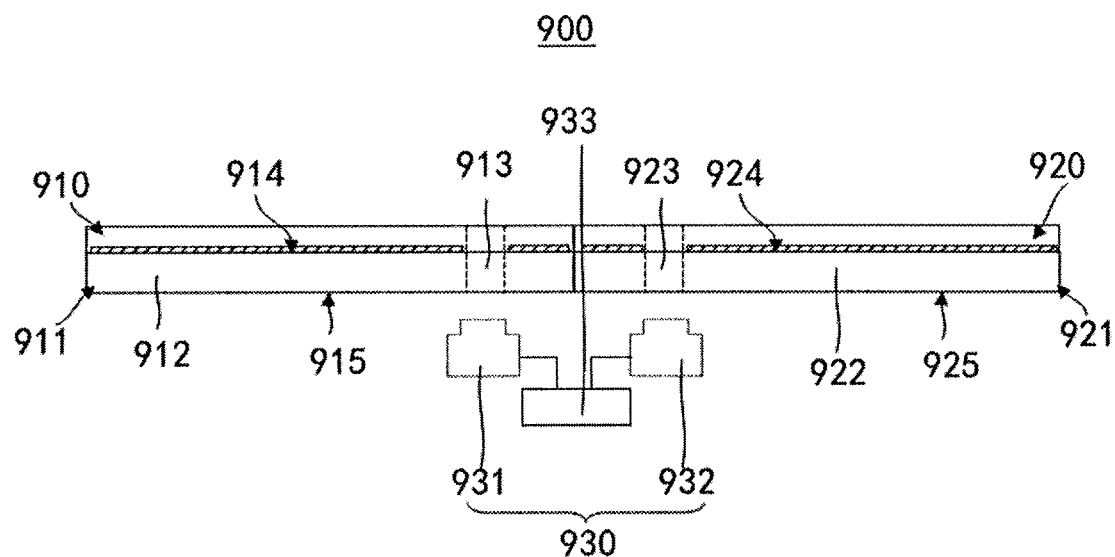
FIG. 12 illustrates a cross-sectional, schematic representation of an exemplary electronic device, in accordance with the eighth embodiment of the present disclosure.

FIG. 12 illustrates an electronic device 900, in accordance with a eighth embodiment of the present disclosure. The electronic device 900 is similar to the electronic device 600 in the fifth embodiment. In the present embodiment, the electronic device 900 includes a first display module 910, a second display module 920 and the optical element 930. The first display module 910 is similar to the first display module 610, and the second display module 920 is similar to the second display module 620. The first display module 910 includes a first display panel 911. The first display panel 911 includes a first display portion 912 and a first transparent portion 913. The second display module 920 includes a second display panel 921. The second display panel 921 includes a second display portion 922 and a second transparent portion 923.

The optical element 930 includes a first light sensing unit 931, a second light sensing unit 932. The electronic device 900 may include a processing unit 933 for processing light signals. The first light sensing unit 931 is disposed on the side of the first rear surface 915 of the first display panel 911 to correspond to the first transparent portion 913 of the first display panel 911. The second light sensing unit 932 is disposed on the side of the second rear surface 925 of the second display panel 921 to correspond to the second transparent portion 923 of the second display panel 921. The processing unit 933 is electrically connected with the first light sensing unit 931 and the second light sensing unit 932 to process the light signals from the first light sensing unit 931 and the second light sensing unit 932.

Figure 13:
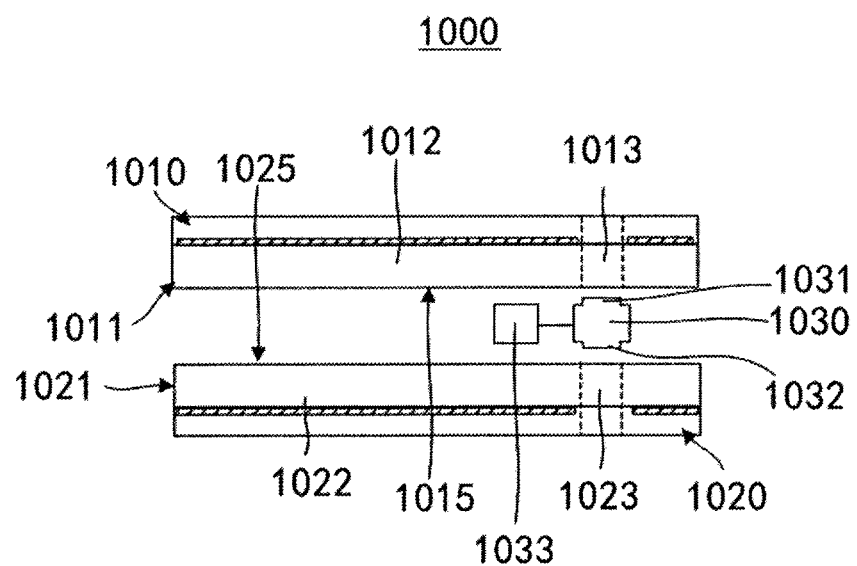
FIG. 13 illustrates a cross-sectional, schematic representation of an exemplary electronic device, in accordance with the ninth embodiment of the present disclosure.

FIG. 13 illustrates an electronic device 1000, in accordance with a ninth embodiment of the present disclosure. The electronic device 1000 is similar to the electronic device 700 in the sixth embodiment. In the present embodiment, the electronic device 1000 includes a first display module 1010, a second display module 1020 and the optical element 1030. The first display module 1010 is similar to the first display module 710, and the second display module 1020 is similar to the second display module 720. The first display module 1010 includes a first display panel 1011. The first display panel 1011 includes a first display portion 1012 and a first transparent portion 1013. The second display module 1020 includes a second display panel 1021. The second display panel 1021 includes a second display portion 1022 and a second transparent portion 1023.

In this embodiment, a first rear surface 1015 of a first display panel 1011 faces a second rear surface 1025 of a second display panel 1021. The optical element 1030 is disposed between a first rear surface 1015 a of a first display panel 1011 and a second surface 1025 of a first display panel 1021. The optical element 1030 includes a first sensing area 1031 and a second sensing area 1032. The electronic device 1000 may include a processing unit 1033 electrically connected with optical element 1030. The processing unit 1033 is configured for processing light signals. The light sensing unit 1003 includes a first sensing area 1031 and a second sensing area 1032. The optical element 1030 is disposed between the first transparent portion 1013 of the first display panel 1011 and the second transparent portion 1023 of the second display panel 1021. The first sensing area 1031 faces to the first transparent portion 1013 of the first display panel 1011, and the second sensing area 1032 faces to the second transparent portion 1023 of the second display panel 1021. The processing unit 1033 process the light signals from the first light sensing area 1031 and/or the second light sensing area 1032. The processing unit 1033 may be configured for controlling the first light sensing area 1031 and the second light sensing area 1032. Thus, by the first light sensing area 1031 or the second light sensing area 1032, external incident light can pass through the first transparent portion 1013 or the second transparent portion 1023 to arrive at the optical element 1030. It is noted that, light emitting from the optical element 1030 also can pass through the first transparent portion 1013 or the second transparent portion 1023 to outside.

According to the present disclosure, the border region for the optical element can be omitted so that the narrow borders design is achieved. During forming the transparent portion, it is not necessary to form the opening in the display panel. Thus, a damage of the display panel can be avoided. Moreover, the area of the transparent portion can be smaller than the area of the opening for the optical element of the conventional phone. Thus, the screen-to-body ratio of the display panel is high. The display panel with high screen-to-body ratio can enhance the user experience.

While the disclosure has been described in terms of what is presently considered to be the most practical and preferred embodiments, it is to be understood that the disclosure needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. An electronic device, comprising:
    a first display module comprising a first display panel and a first touch sensor circuit, the first display panel comprising a first active area and a first transparent non-active area, the first transparent non-active area being surrounded by and adjacent to the first active area, and the first touch sensor circuit is located on the first active area;
    a second display module coupled to the first display module, the second display module comprising a second display panel and a second touch sensor circuit, the second display panel comprising a second active area and a second transparent non-active area, the second transparent non-active area being surrounded by and adjacent to the second active area, and the second touch sensor circuit is located on the second active area; and
    an optical element, alternatively disposed to cooperate with the first transparent non-active area or face the second transparent non-active area to process the light;
    wherein the first active area and the second active area each comprise a display surface and a rear surface opposite to the display surface, the first transparent non-active area and the second transparent non-active area each comprise a first surface on the same side as the rear surface and a second surface on the same side as the display surface, and the second surface and the display surface are coplanar.

2. The electronic device as claimed in claim 1, wherein the first transparent non-active area is free of the first touch sensor circuit, and the second transparent non-active area is free of the second touch sensor circuit.

3. The electronic device as claimed in claim 1, wherein the optical element is disposed by a rotatable mechanism.

4. The electronic device as claimed in claim 1, wherein the first active area and the second active area each comprise a plurality of pixels, and the first transparent non-active area and the second transparent non-active area each are without the pixels.

5. The electronic device as claimed in claim 4, wherein the first transparent non-active area is surrounded by the plurality of pixels of the first active area, and the second transparent non-active area is surrounded by the plurality of pixels of the second active area.

6. The electronic device as claimed in claim 1, wherein a light transmittance of the first and second transparent non-active portions is more than 50%.

7. The electronic device as claimed in claim 1, wherein the first and second transparent non-active portions are made of a transparent material.

8. A display module, comprising:
    a display panel comprising a display portion and a transparent portion, the display portion comprising a plurality of pixels, the transparent portion without the pixels being adjacent to the display portion and surrounded by the plurality of pixels of the display portion;
    wherein the display portion comprises a display surface and a rear surface opposite to the display surface, the transparent portion comprises a first surface on the same side as the rear surface and a second surface on the same side as the display surface, the second surface and the display surface are coplanar, the first surface is a convex surface and protrudes away from the rear surface of the display portion, and the transparent portion is made of a transparent material.

9. The display module as claimed in claim 8, wherein a light transmittance of the transparent portion is more than 50%.

10. The display module as claimed in claim 8, wherein the display panel comprises a first side, a second side, a third side and a fourth side, each of the first side and the second side is connected between the third side and the fourth side and is shorter than either of the third side and the fourth side, and the transparent portion is adjacent to the first side and far away from the second side.

11. The display module as claimed in claim 8, further comprising:
a transparent cover covering the display panel, wherein the transparent cover comprises a first portion and a second portion, the first portion is located on the display portion, the second portion is located on the transparent portion, and the first portion has a touch sensor circuit formed.

12. The display module as claimed in claim 11, wherein the transparent cover is made of a material selected from a group of glass, sapphire and polyvinyl chloride.

13. An electronic device, comprising:
a display module, comprising:
a display panel comprising a display portion and a transparent portion, the display panel having a display surface and a rear surface opposite to the display surface, the display portion comprising a plurality of pixels, the transparent portion without the pixels being adjacent to the display portion and surrounded by the plurality of pixels, wherein the transparent portion comprises a first surface on the same side as the rear surface and a second surface on the same side as the display surface, the second surface and the display surface are coplanar, the first surface and the rear surface are coplanar, and the transparent portion is made of a transparent material; and
an optical element, disposed on a side of the rear surface, facing the transparent portion and configured to receive light penetrating the transparent portion or emit light to penetrate the transparent portion.

14. The electronic device as claimed in claim 13, wherein the optical element has a light sensing area, and a vertical projection of the light sensing area on the display surface is surrounded by and adjacent to a vertical projection of the transparent portion on the display surface.

15. The electronic device as claimed in claim 14, wherein a central position of a projection of the transparent portion on the display surface is overlapped with a central position of a projection of the optical element on the display surface.

16. The electronic device as claimed in claim 13, wherein a light transmittance of the transparent portion is more than 50%.

17. The electronic device as claimed in claim 13, wherein the optical element is selected from a group of a camera, a light sensor, an optical fingerprint sensor, and a flashlight.

18. The electronic device as claimed in claim 13, further comprising a housing for accommodating the display panel and the optical element.

19. The electronic device as claimed in claim 13, wherein the display module further comprises a transparent cover covering the display panel, the transparent cover comprises a first portion and a second portion, the first portion is located on the display portion, the second portion is located on the transparent portion, and the first portion has a touch sensor circuit formed.

20. The electronic device as claimed in claim 19, wherein the transparent cover is made of a material selected from a group of glass, sapphire and polyvinyl chloride.

* * * * *